(12) United States Patent
Okada

(10) Patent No.: US 9,728,833 B2
(45) Date of Patent: Aug. 8, 2017

(54) CONNECTOR APPARATUS AND RADIO TRANSMISSION SYSTEM

(71) Applicant: SONY SEMICONDUCTOR SOLUTIONS CORPORATION, Kanagawa (JP)

(72) Inventor: Yasuhiro Okada, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 14/783,565

(22) PCT Filed: Mar. 27, 2014

(86) PCT No.: PCT/JP2014/058959
§ 371 (c)(1),
(2) Date: Oct. 9, 2015

(87) PCT Pub. No.: WO2014/171292
PCT Pub. Date: Oct. 23, 2014

(65) Prior Publication Data
US 2016/0036114 A1 Feb. 4, 2016

(30) Foreign Application Priority Data

Apr. 18, 2013 (JP) .................. 2013-087059

(51) Int. Cl.
*H04B 5/00* (2006.01)
*H01P 5/107* (2006.01)
(Continued)

(52) U.S. Cl.
CPC .................. *H01P 3/16* (2013.01); *H01P 3/12* (2013.01); *H01P 5/087* (2013.01); *H01P 5/107* (2013.01); *H02J 5/005* (2013.01)

(58) Field of Classification Search
CPC ........................................................ H04B 5/00
See application file for complete search history.

(56) References Cited

U.S. PATENT DOCUMENTS 5,923,295 A * 7/1999 Nakano ............... H01Q 1/38
343/700 MS
9,312,919 B1 * 4/2016 Barzegar ............... H04B 3/546
(Continued)

FOREIGN PATENT DOCUMENTS

JP 56-103501 A 8/1981
JP 117308/1988 3/1990
(Continued)

OTHER PUBLICATIONS

International Search Report prepared by the Japanese Patent Office on Jun. 18, 2014, for International Application No. PCT/JP2014/058959.

*Primary Examiner* — Cindy Trandai
(74) *Attorney, Agent, or Firm* — Sheridan Ross, P.C.

(57) ABSTRACT

The present invention includes a first connector unit, a second connector unit, and a joining unit. The first connector unit is provided at an end section of a feeder cable formed on a circuit substrate. The second connector unit is provided at an end section of a waveguide cable through which a high-frequency signal is transmitted. The joining unit includes a hollow waveguide interposed between the first connector unit and the second connector unit, the joining unit being capable of detachably joining the first connector unit and the second connector unit.

18 Claims, 13 Drawing Sheets

(51) Int. Cl.
*H01P 3/16* (2006.01)
*H01P 3/12* (2006.01)
*H02J 5/00* (2016.01)
*H01P 5/08* (2006.01)

(56) References Cited

U.S. PATENT DOCUMENTS

| | | | |
|---|---|---|---|
| 9,503,189 B2* | 11/2016 | Lee ................... | H04B 3/52 |
| 2002/0044097 A1* | 4/2002 | Yuanzhu ................. | H01P 1/172 |
| | | | 343/746 |
| 2002/0101299 A1* | 8/2002 | Kitamori ................. | H01P 5/087 |
| | | | 333/137 |
| 2002/0130808 A1* | 9/2002 | Fukushima ............. | H01P 1/067 |
| | | | 342/75 |
| 2002/0175784 A1* | 11/2002 | Yamashita ............... | H01P 3/12 |
| | | | 333/239 |
| 2008/0085082 A1* | 4/2008 | Theis ................... | G02B 6/3893 |
| | | | 385/72 |
| 2008/0153416 A1* | 6/2008 | Washiro .................. | H04B 5/00 |
| | | | 455/41.1 |
| 2009/0066587 A1* | 3/2009 | Hayes .................. | H01Q 1/2275 |
| | | | 343/702 |
| 2010/0231320 A1* | 9/2010 | Kawamura ............. | H01L 23/66 |
| | | | 333/33 |
| 2011/0026443 A1* | 2/2011 | Okada ...................... | H01P 1/17 |
| | | | 370/280 |
| 2011/0095385 A1* | 4/2011 | Kawamura ........... | H01L 23/645 |
| | | | 257/428 |
| 2012/0093041 A1* | 4/2012 | Takeda ..................... | H01P 1/06 |
| | | | 370/280 |
| 2013/0163483 A1* | 6/2013 | Sarraf .................... | H01Q 1/521 |
| | | | 370/277 |

FOREIGN PATENT DOCUMENTS

| | | |
|---|---|---|
| JP | H02-038808 | 3/1990 |
| JP | H04-271501 | 9/1992 |
| JP | 2005-318360 A | 11/2005 |
| JP | 2009-303076 A | 12/2009 |
| WO | WO 2011/033639 A1 | 3/2011 |

* cited by examiner

FIG.1A
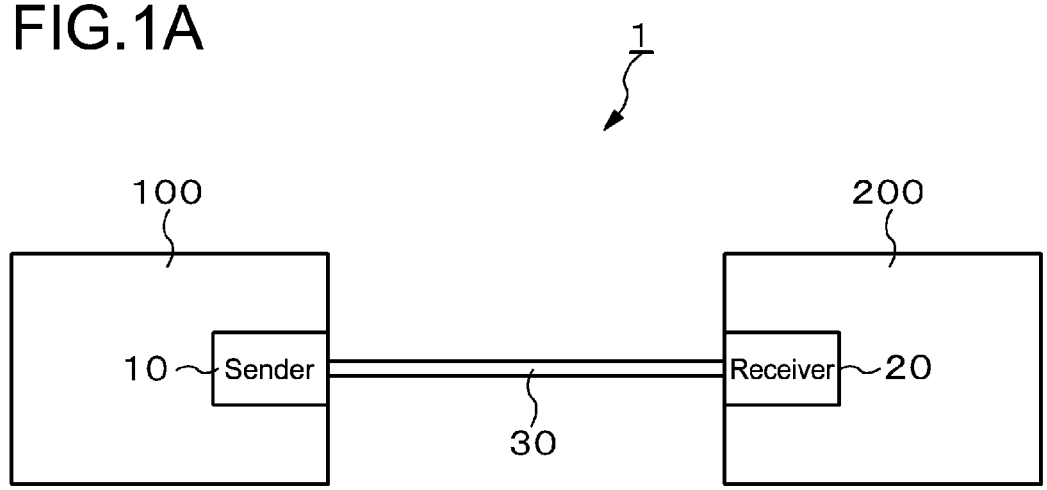
FIG.1B
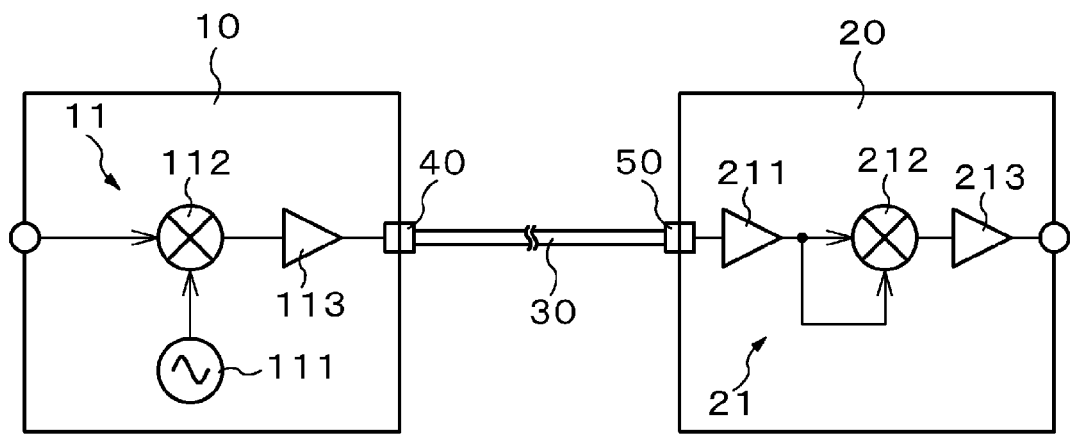
FIGS.1

FIG.2A
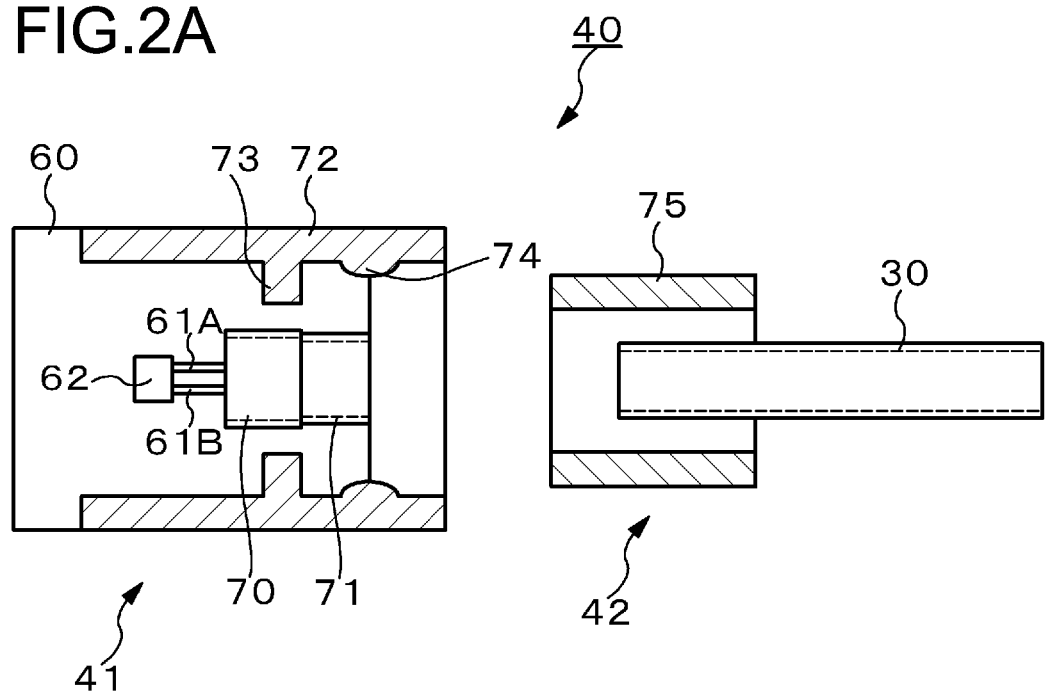
FIG.2B
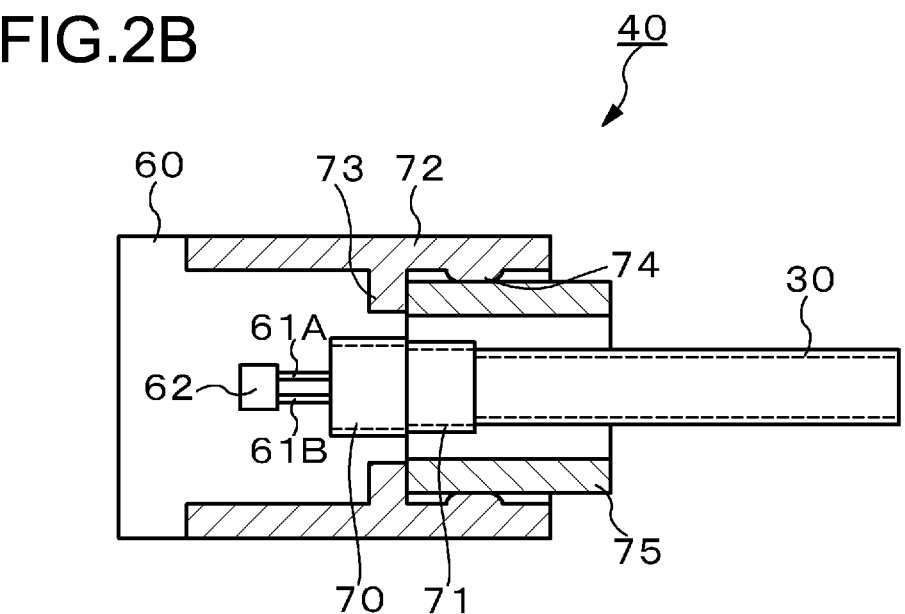
FIGS.2

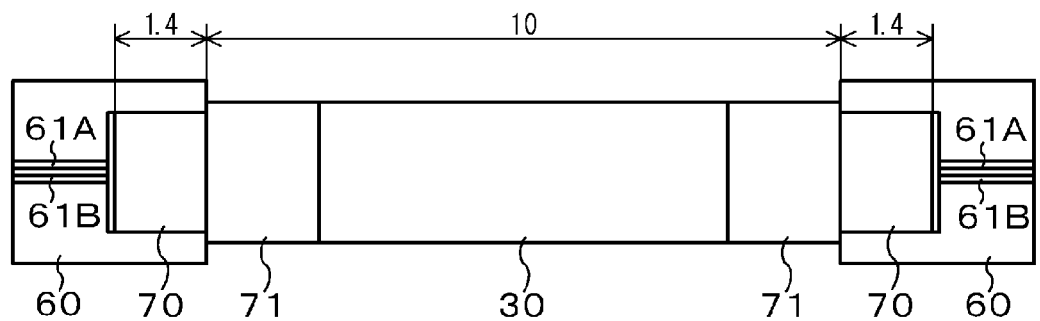
FIG.4A
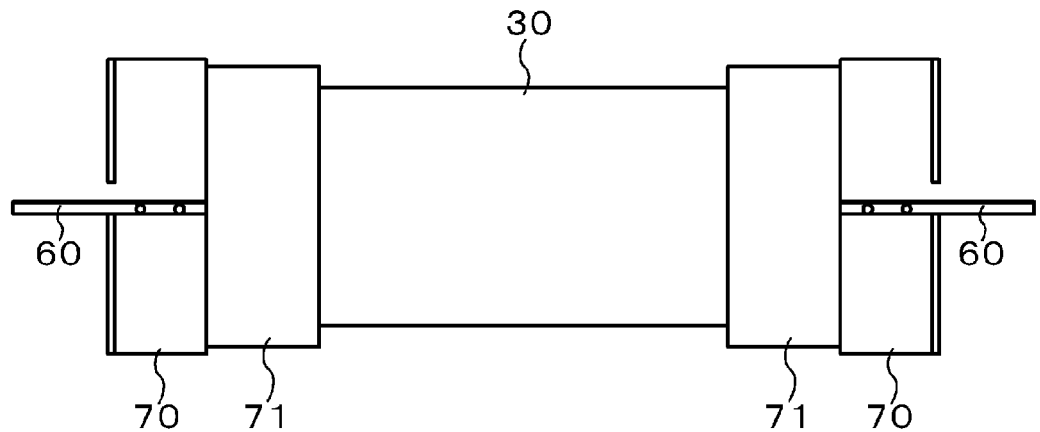
FIG.4B
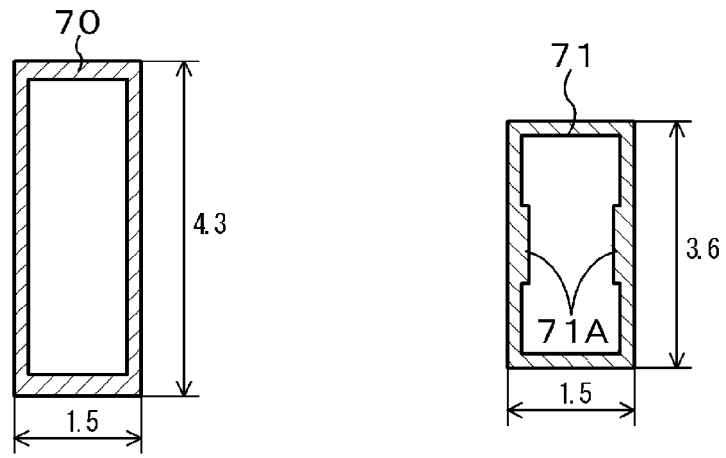
FIG.4C
FIGS.4

FIG.5A
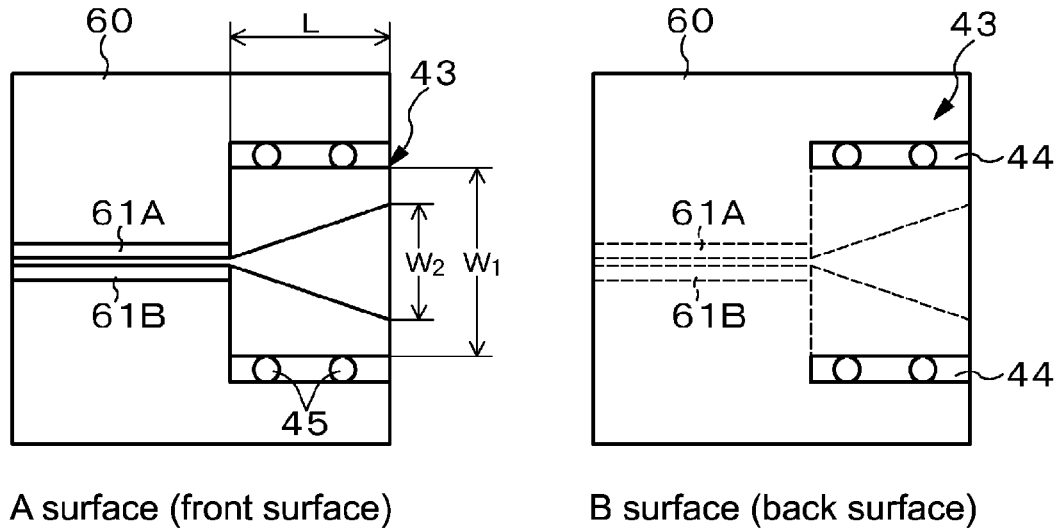
A surface (front surface)     B surface (back surface)
FIG.5B
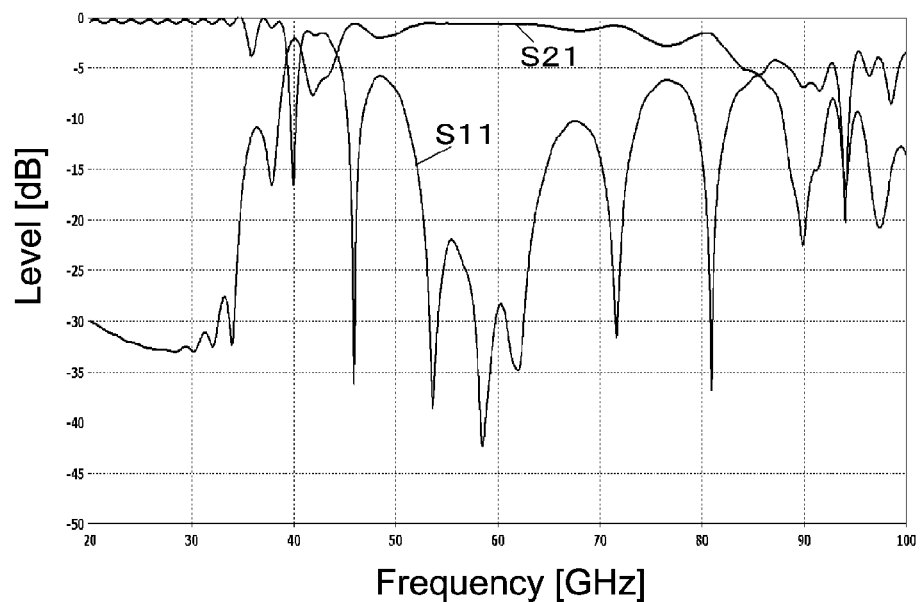
FIGS.5

FIG.7A
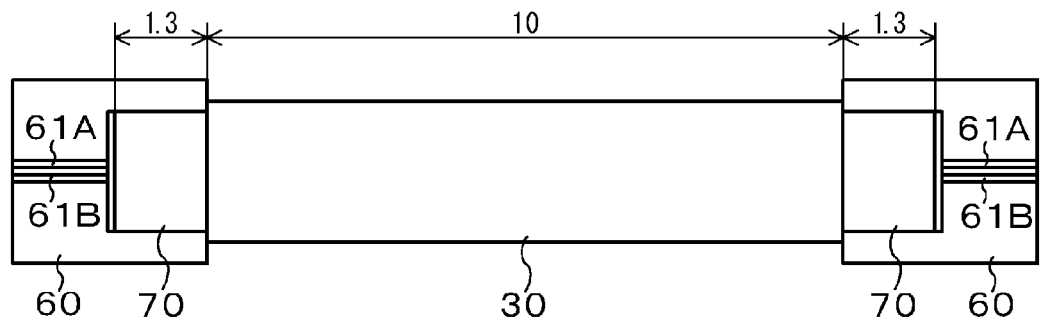
FIG.7B
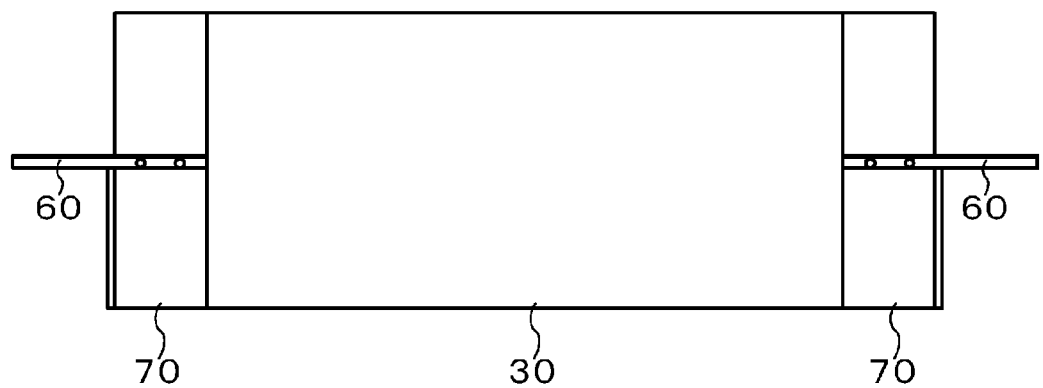
FIG.7C
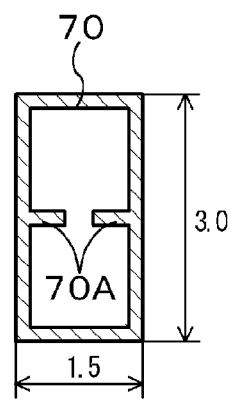
FIGS.7

FIG.8A
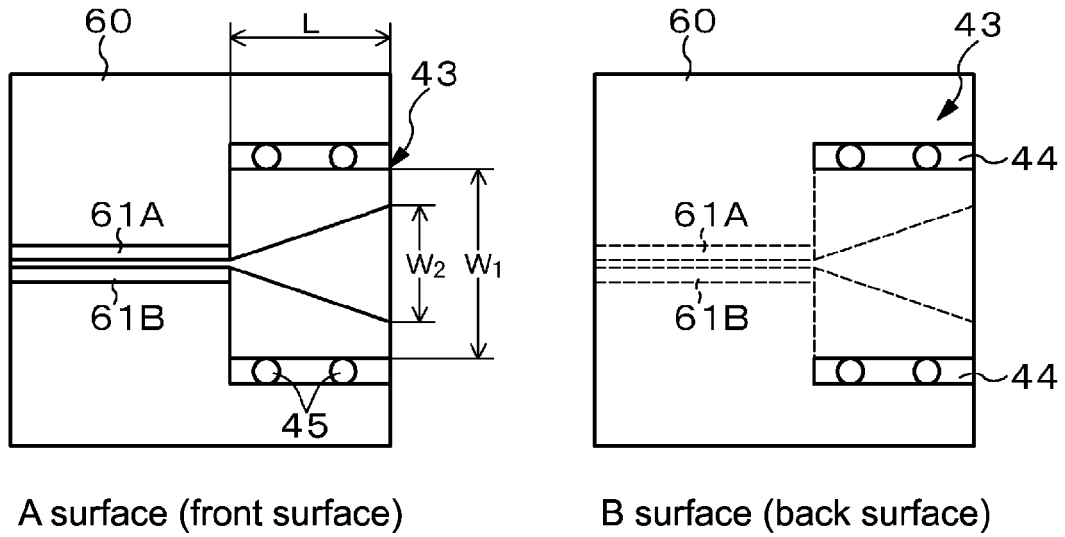
A surface (front surface)　　　B surface (back surface)
FIG.8B
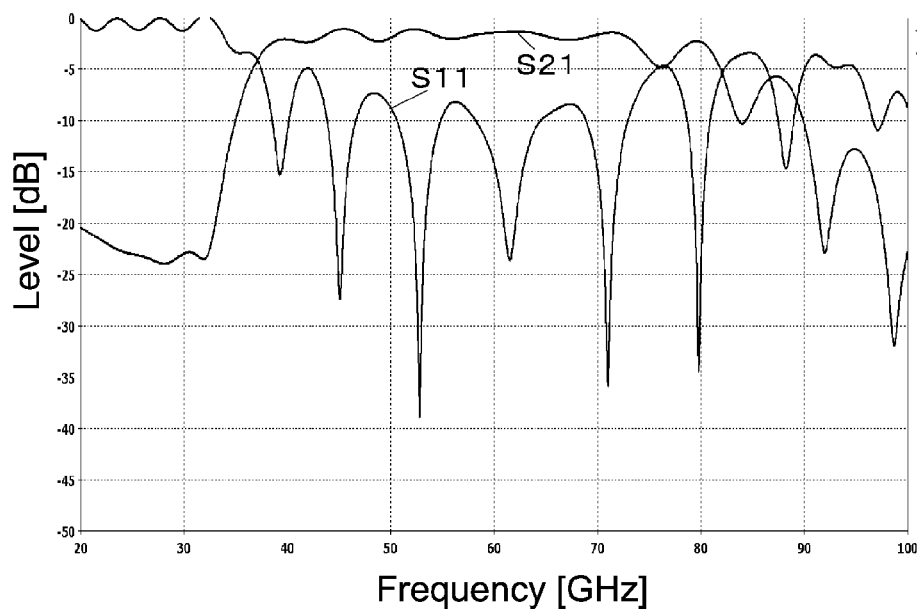
FIGS.8

FIG.10A
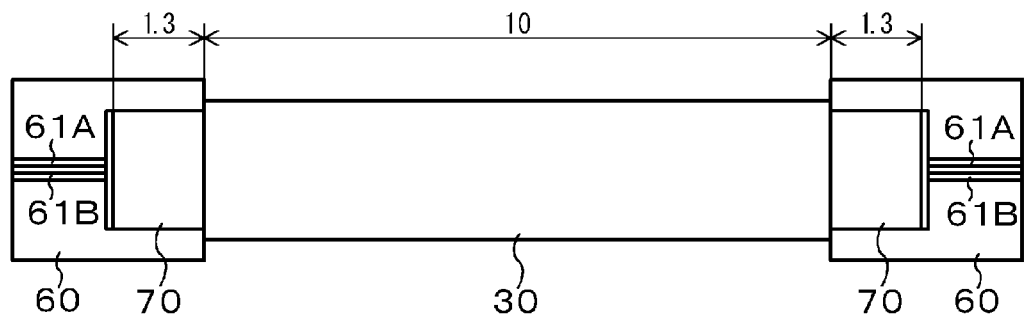
FIG.10B
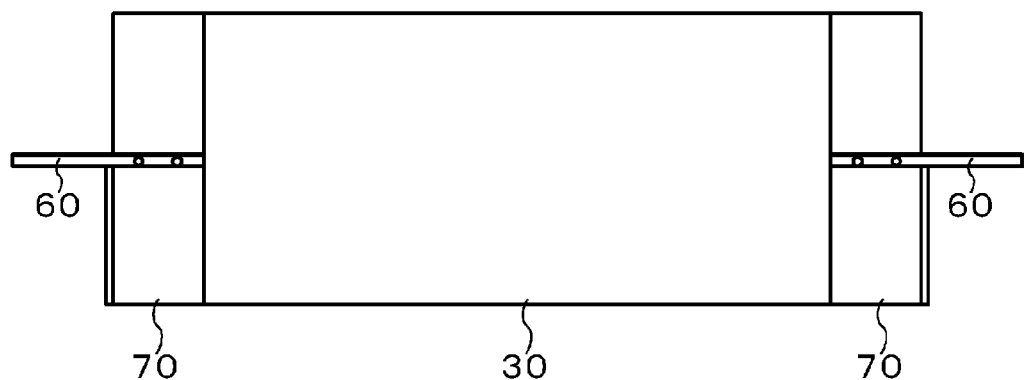
FIG.10C
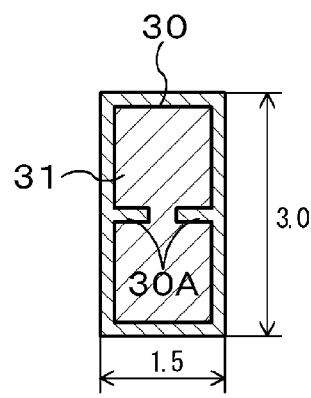
FIGS.10

FIG.11A
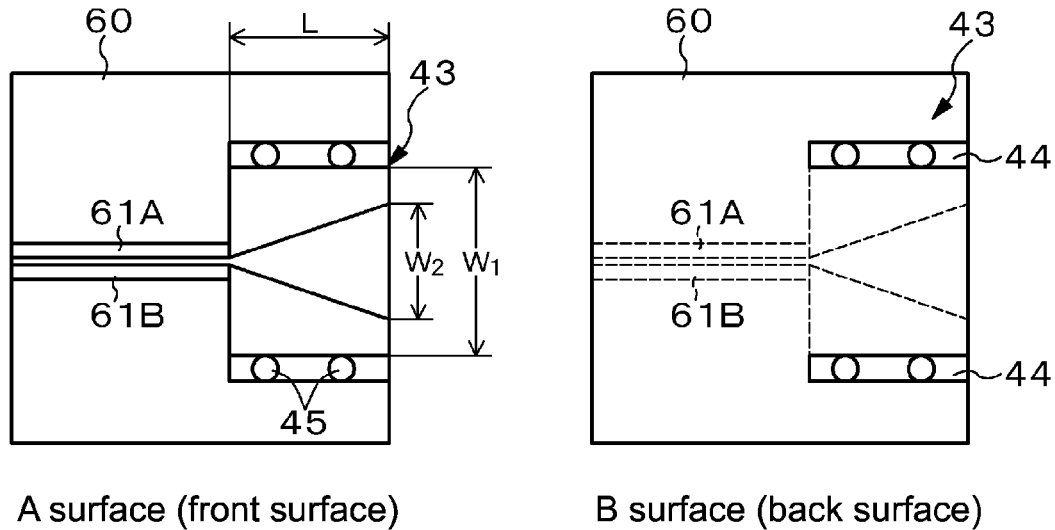
A surface (front surface)    B surface (back surface)
FIG.11B
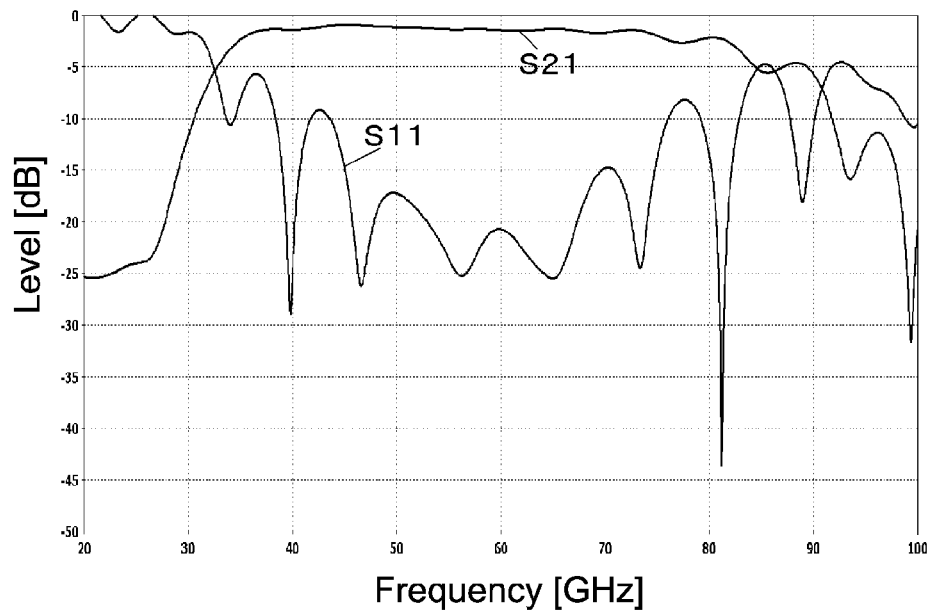
FIGS.11

FIG.12A
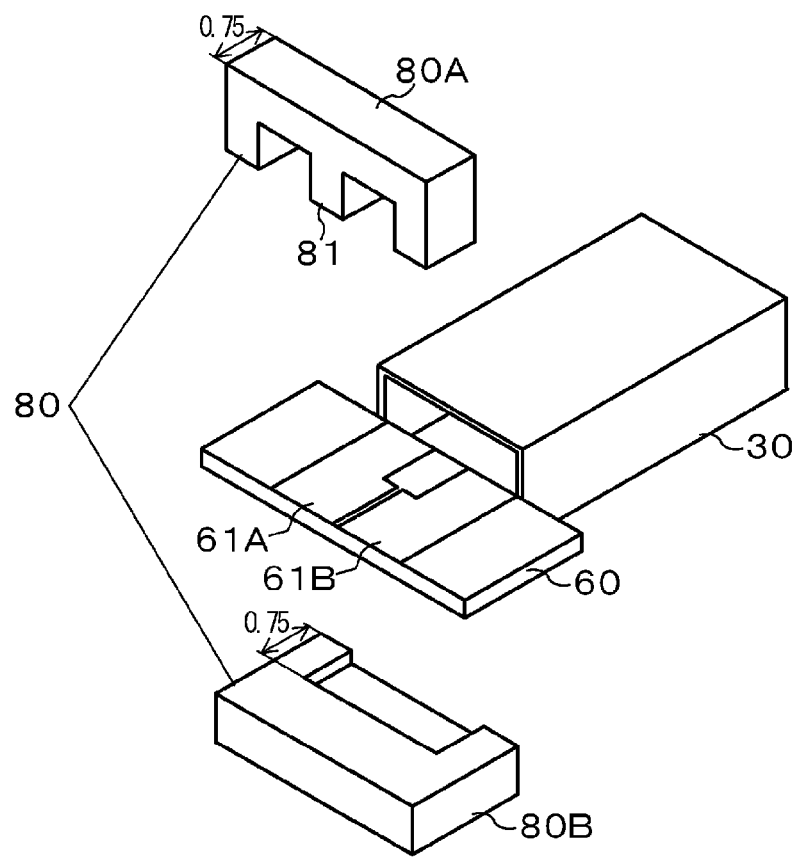
FIG.12B
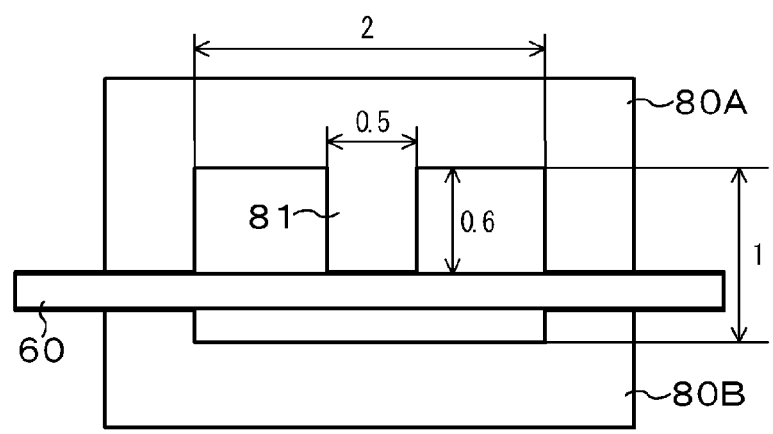
FIGS.12

CONNECTOR APPARATUS AND RADIO TRANSMISSION SYSTEM

CROSS REFERENCE TO RELATED APPLICATIONS

This application is a national stage application under 35 U.S.C. 371 and claims the benefit of PCT Application No. PCT/JP2014/058959 having an international filing date of Mar. 27, 2014, which designated the United States, which PCT application claimed the benefit of Japanese Patent Application No. 2013-087059 filed Apr. 18, 2013, the disclosures of which are incorporated herein by reference in their entirety.

TECHNICAL FIELD

The present disclosure relates to a connector apparatus and a radio transmission system.

BACKGROUND ART

In a system in which a waveguide cable transmits high-frequency signals, e.g., millimeter-wave signals or microwave signals, it is necessary to connect a feeder wire on a circuit board and a waveguide cable. In the past, this connection is established by using a waveguide-microstrip line converter, which includes a short stub of ¼ wavelength (approximately) made of antipodal lines and short-circuited on a tube wall of the waveguide (for example, see Patent Document 1).

Patent Document 1: Japanese Patent Application Laid-open No. H04-271501

SUMMARY OF INVENTION

Problem to be Solved by the Invention

In the related art such as the waveguide-microstrip line converter of Patent Document 1, the connection portion between a feeder wire on a circuit board and a waveguide cable is fixed. So it is not possible to connect the feeder wire and the waveguide cable or to disconnect between them arbitrarily (without restraint). On the other hand, depending on a system configured to transmit millimeter-wave or microwave signals, it may be convenient to have a structure in which a circuit board is connected/disconnected to/from a waveguide cable arbitrarily.

It is an object of the present disclosure to provide a connector apparatus configured to connect/disconnect a circuit board to/from a waveguide cable arbitrarily, and a radio transmission system including the connector apparatus.

Means for Solving the Problem

To attain the above-mentioned object, according to a first embodiment of the present disclosure, there is provided a connector apparatus, including:

a hollow waveguide provided on a circuit board, the hollow waveguide being electromagnetically-coupled with a feeder wire formed on the circuit board, in which the hollow waveguide is detachably coupled with an end of a waveguide cable configured to transmit a high-frequency signal.

Further, to attain the above-mentioned object, according to a second embodiment of the present disclosure, there is provided a connector apparatus, including:

a hollow waveguide provided on an end of a waveguide cable configured to transmit a high-frequency signal, the hollow waveguide being electromagnetically-coupled with the waveguide cable, in which the hollow waveguide is detachably coupled with an end of a feeder wire formed on a circuit board.

Further, to attain the above-mentioned object, according to a third embodiment of the present disclosure, there is provided a connector apparatus, including:

a first connector unit provided on an end of a feeder wire formed on a circuit board;

a second connector unit provided on an end of a waveguide cable configured to transmit a high-frequency signal; and a coupler including a hollow waveguide interposed between the first connector unit and the second connector unit, the coupler being configured to detachably couple the first connector unit and the second connector unit.

Further, to attain the above-mentioned object, there is provided a wireless transmission system, including:

a sender configured to send a high-frequency signal;

a receiver configured to receive the high-frequency signal;

a waveguide cable configured to transmit the high-frequency signal between the sender and the receiver; and a connector apparatus configured to connect at least one of the sender and the receiver, and the waveguide cable, in which the connector apparatus includes a first connector unit provided on an end of a feeder wire formed on a circuit board, a second connector unit provided on an end of a waveguide cable configured to transmit a high-frequency signal, and a coupler including a hollow waveguide interposed between the first connector unit and the second connector unit, the coupler being configured to detachably couple the first connector unit and the second connector unit.

The connector apparatus of the above-mentioned first, second, or third embodiment or the radio transmission system is structured such that the hollow waveguide is interposed between the connector unit on the circuit board and the connector unit of the waveguide cable, and that the connector units are detachably coupled at the hollow waveguide. With this structure, it is possible to connect the circuit board side and the waveguide cable side arbitrarily and to disconnect them. Here, "detachability" conceptually includes "easiness to detach", which means that it takes less trouble to connect (attach) them or disconnect (detach) them. In other words, the above-defined "detachability" does not conceptually includes for example a coaxial connector apparatus, which is attached or detached by using screw-type fixing members or the like.

Effect of the Invention

According to the present disclosure, because the connector apparatus is detachably interposed between the feeder wire on the circuit board and the waveguide cable, it is possible to connect/disconnect the circuit board side to/from the waveguide cable side arbitrarily.

Note that the effects described in the specification are merely examples, effects are not limited to them, and additional effects may be obtained.

BRIEF DESCRIPTION OF DRAWINGS

FIG. 1A is a block diagram showing an example of the structure of a wireless transmission system to which the technology of the present disclosure is applicable, and FIG. 1B is a block diagram showing an example of the specific structure of a sender and a receiver of the wireless transmission system.

FIG. 2A is a partial-cross-sectional plan view showing the connector apparatus according to the embodiment of the present disclosure before coupling, and FIG. 2B is a partial-cross-sectional plan view showing the connector apparatus coupled.

FIG. 4A is a plan view of FIG. 3, FIG. 4B is a side view of FIG. 3, and FIG. 4C is a cross-sectional view showing a hollow waveguide and a spacer.

FIG. 5A shows a structural example of the ends of the feeder wires on the circuit board, and FIG. 5B shows transmission properties between the feeder wires and the waveguide cable of Example 1.

FIG. 7A is a plan view showing that of FIG. 6, FIG. 7B is a side view showing that of FIG. 6, and FIG. 7C is a cross-sectional view showing a hollow ridge waveguide used as a hollow waveguide.

FIG. 8A shows an example of the structure of the ends of the feeder wires on the circuit board, and FIG. 8B shows signal transmission properties between feeder wires and a waveguide cable of Example 2.

FIG. 10A is a plan view showing that of FIG. 9, FIG. 10B is a side view showing that of FIG. 9, and FIG. 10C is a cross-sectional view showing a hollow ridge waveguide used as a hollow waveguide, and a waveguide cable.

FIG. 11A shows an example of the structure of the ends of the feeder wires on the circuit board, and FIG. 11B shows signal transmission properties between feeder wires and a waveguide cable of Example 3.

FIG. 12A is a perspective view schematically showing a connector apparatus of a modified example, and FIG. 12B is a front view showing that of FIG. 12A.

Modes for Carrying Out the Invention

Figure 3:
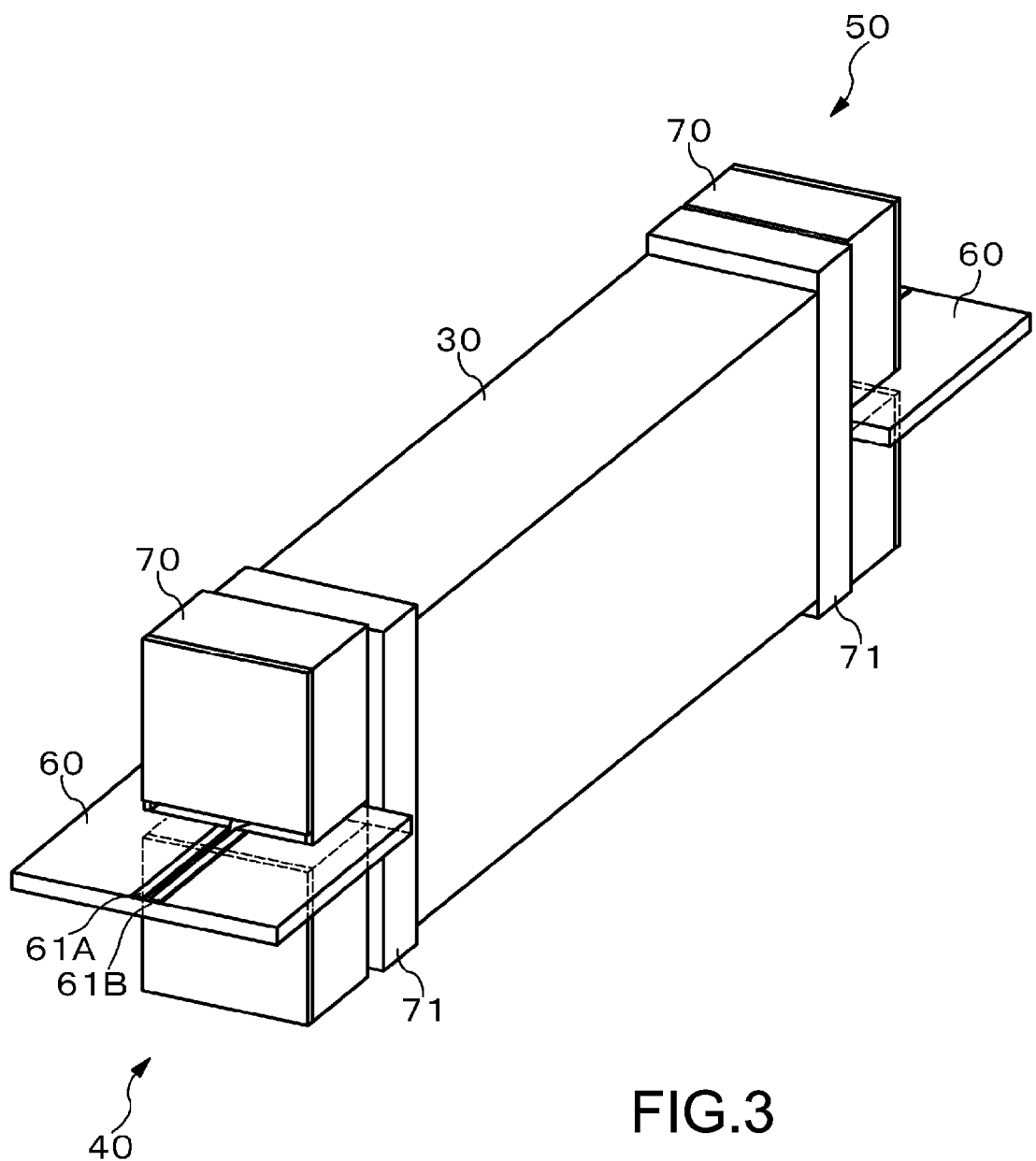
FIG. 3 is a perspective view schematically showing a connector apparatus according to Example 1.

Hereinafter, an embodiment of the technology of the present disclosure (hereinafter referred to as "embodiment") will be described in detail with reference to the drawings. The present disclosure is not limited to the embodiment, and various numerical values, materials, and the like of the embodiment are examples. In the following description, the same elements or elements having the same function will be denoted by the same reference symbols, and duplicated description will be omitted. Note that description will be given in the following order.

1. General description of a connector apparatus and a wireless transmission system of the present disclosure
2. Wireless transmission system to which the technology of the present disclosure is applicable
3. Connector apparatus according to the embodiment
   3-1. Example 1 (horizontal electric field coupling: dielectric waveguide is used in this example)
   3-2. Example 2 (horizontal electric field coupling: hollow ridge waveguide is used in this example)
   3-3. Example 3 (horizontal electric field coupling: dielectric ridge waveguide is used in this example)
4. Modified example (example of vertical electric field coupling)

<General Description of a Connector Apparatus and a Wireless Transmission System of the Present Disclosure>

A wireless transmission system, which is configured to transmit electromagnetic waves, i.e., particularly high-frequency signals such as microwaves, millimeter waves, or terahertz waves, via a waveguide as a medium, is preferably used to transmit signals between various kinds of apparatuses such as electronic apparatuses, information processing apparatuses, and semiconductor apparatuses, and to transmit signals between circuit boards of a single apparatus. In the wireless transmission system, a waveguide, which is configured to transmit high-frequency signals, is sometimes referred to as a waveguide cable, because it functions as a cable connecting apparatuses or circuit boards.

For example, millimeter waves of high-frequency waves are radio waves whose frequency is 30 [GHz] to 300 [GHz] (wavelength is 1 [mm] to 10 [mm]). If millimeter-waveband signals are transmitted, it is possible to transmit signals at higher speed of Gbps order (for example, 5 [Gbps] or more). For example, examples of signals, which are required to be transmitted at higher speed of Gbps order, include data signal of cinema videos, computer images, and the like. Further, to transmit millimeter-waveband signals is excellent in interference immunity, and does not adversely affect other electric wiring in cable connection between apparatuses, which are advantages.

In the wireless transmission system configured to transmit for example millimeter-waveband signals of high-frequency signals, a waveguide cable may be made of a hollow waveguide or made of a dielectric waveguide. It is desirable to use a dielectric waveguide, which is better in flexibility than a hollow waveguide. In a dielectric waveguide, electromagnetic waves form an electromagnetic field depending on a wavelength (frequency) or the like, and propagate in the dielectric at the same time.

In a radio transmission system including a waveguide cable, a circuit board is connected to a waveguide cable or a waveguide cable is connected to a circuit board via a connector apparatus. In this specification, a connector apparatus of a first mode means a connector apparatus including a connector unit on the circuit board, and a connector apparatus of a second mode means a connector apparatus including a connector unit of the waveguide cable. Further, a connector apparatus of a third mode means a connector apparatus including a connector unit (first connector unit) on the circuit board and a connector unit (second connector unit) of the waveguide cable.

According to the connector apparatus of the first or second mode, a spacer may be interposed between the hollow waveguide and the end of the waveguide cable. In this case, the spacer may be a hollow ridge waveguide.

Further, according to the connector apparatus of the first or second mode, the hollow waveguide may be a hollow ridge waveguide.

Further, according to the connector apparatus of the first or second mode, the waveguide cable may be a dielectric waveguide, or the waveguide cable may be a dielectric ridge waveguide.

Further, according to the connector apparatus of the third mode, the hollow waveguide may be provided on the circuit board, the hollow waveguide being electromagnetically-coupled with the dielectric waveguide. In other words, the first connector unit may include the hollow waveguide. Alternatively, the hollow waveguide may be provided on the end of the waveguide cable, the hollow waveguide being electromagnetically-coupled with the end of the waveguide cable. In other words, the second connector unit may include the hollow waveguide.

<Wireless Transmission System to which the Technology of the Present Disclosure is Applicable>

With reference to FIG. 1A and FIG. 1B, an example of a wireless transmission system to which the technology of the present disclosure is applicable will be described. FIG. 1A is a block diagram showing an example of the structure of a wireless transmission system to which the technology of the present disclosure is applicable, and FIG. 1B is a block diagram showing an example of the specific structure of a sender and a receiver of the wireless transmission system.

As shown in FIG. 1, the wireless transmission system 1 of this application example includes the sender 10 configured to send high-frequency signals, the receiver 20 configured to receive the high-frequency signals, and the dielectric waveguide cable (dielectric waveguide) 30 configured to transmit the high-frequency signals between the sender 10 and the receiver 20.

In the following example, a wireless transmission system, which is configured to transmit for example millimeter-waveband signals of high-frequency signals by using a waveguide cable, will be described. A waveguide cable may be made of a hollow waveguide or may be made of a dielectric waveguide.

By the way, millimeter-waveband signals (millimeter-wave communication) being high-frequency signals are advantageous as follows.

a) Because the communication band of the millimeter-wave communication is wider, it is easy to make the data rate higher.

b) It is possible to remove the frequency used for transmission from the other frequency of baseband signal processing, and therefore the frequency of millimeter waves rarely interfere with the frequency of baseband signals.

c) Because the wavelength of millimeter wavebands is small, it is possible to make the waveguide structure, which depends on a wavelength, smaller. In addition, because distance decay is larger and diffraction is smaller, it is easy to shield electromagnetic fields.

d) In general wireless communication, stability of carrier waves is strictly regulated in order to prevent interference and the like from occurring. In order to realize such carrier waves high in stability, external frequency reference components, multiplier circuits, PLLs (phase lock loop circuits), and the like higher in stability are used, and the circuit is made larger in size. To the contrary, in millimeter-wave communication, it is possible to prevent leakage to outside from occurring easily and in addition to use carrier waves lower in stability for transmission, and it is therefore possible to prevent the size of the circuit from being increased.

In the wireless transmission system 1 of this application example configured to transmit millimeter-waveband signals, the sender 10 is configured to convert signals-to-be-transmitted into millimeter-wave signals, and to output the millimeter-wave signals to the dielectric waveguide cable 30. The receiver 20 is configured to receive the millimeter-wave signals transmitted through the dielectric waveguide cable 30, and to restore (decode) the millimeter-wave signals to the original signals-to-be-transmitted.

In this application example, the first communication apparatus 100 includes the sender, and the second communication apparatus 200 includes the receiver 20. In this case, the waveguide cable 30 transmits high-frequency signals between the first communication apparatus 100 and the second communication apparatus 200, in other words. The communication apparatuses 100, 200 configured to send/receive signals via the waveguide cable 30 include the sender 10 and the receiver 20 in a pair, respectively. The signal transmission method between the first communication apparatus 100 and the second communication apparatus 200 may be a unidirectional (one-way) transmission method or a bidirectional transmission method.

The sender 10 (the first communication apparatus 100) and the receiver 20 (the second communication apparatus 200) are arranged in a predetermined area. Here, because high-frequency signals are millimeter-wave signals, it is only necessary that the "predetermined area" is determined as long as a millimeter-wave transmittable area can be restricted. Typically, the distance of the "predetermined area" is smaller than distances between communication apparatuses used for broadcasting and general wireless communication.

Examples of arrangement of the sender 10 and the receiver 20 in the predetermined area include arrangement in separate communication apparatuses (electronic apparatuses), i.e., the first communication apparatus 100 and the second communication apparatus 200, as shown in FIG. 1A, and in addition the following arrangement. For example, it is conceivable that the sender 10 and the receiver 20 are arranged on separate circuit boards of one electronic apparatus. In this arrangement, one circuit board corresponds to the first communication apparatus 100, and the other circuit board corresponds to the second communication apparatus 200.

Alternatively, it is conceivable that the sender 10 and the receiver 20 are arranged on separate semiconductor chips of one electronic apparatus. In this example, one semiconductor chip corresponds to the first communication apparatus 100, and the other semiconductor chip corresponds to the second communication apparatus 200. Further, it is conceivable that the sender 10 and the receiver 20 are arranged on separate circuit parts of one circuit board, respectively. In this example, one circuit part corresponds to the first communication apparatus 100, and the other circuit part corresponds to the second communication apparatus 200. It should be noted that the arrangement is not limited to the above-mentioned examples.

Meanwhile, it is conceivable that examples of the pair of the first communication apparatus 100 and the second communication apparatus 200 are as follows. It should be noted that the following pairs are merely examples and are not limited to them.

According to a conceivable pair, if the second communication apparatus 200 is a battery-powered apparatus such as a mobile phone, a digital camera, a video camera, a game machine, or a remote control, the first communication apparatus 100 is a so-called base station configured to charge its battery and to process images. According to another conceivable pair, if the second communication apparatus 200 has a relatively-thin appearance such as an electronic card, the first communication apparatus 100 is a card reader/writer apparatus therefor. Further, the card reader/writer apparatus is used with, for example, a main electronic apparatus such as a digital recorder/reproducer, a terrestrial television receiver, a mobile phone, a game machine, or a computer in combination. Further, if they are applicable to an image-pickup apparatus, for example, the first communication apparatus 100 is at the main board side and the second communication apparatus 200 is at the image-pickup board side, and they transmit signals in one apparatus (device).

Next, with reference to FIG. 1B, a specific structural example of the sender 10 and the receiver 20 will be described.

The sender 10 includes, for example, the signal generator 11 configured to process signals-to-be-transmitted and to generate millimeter-wave signals. The signal generator 11 is a signal converter configured to convert signals-to-be-transmitted to millimeter-wave signals, and includes, for example, an ASK (Amplitude Shift Keying) modulation circuit. Specifically, the signal generator 11 is configured to multiply, by the multiplier 112, millimeter-wave signals from the oscillator 111 by signals-to-be-transmitted, to thereby generate ASK modulation waves being millimeter waves, and to output the obtained waves via the buffer 113. The connector apparatus 40 is interposed between the sender 10 and the waveguide cable 30.

Meanwhile, the receiver 20 includes, for example, the signal decoder 21 configured to process millimeter-wave signals from the waveguide cable 30, to decode the millimeter-wave signals, and to thereby obtain original signals-to-be-transmitted. The signal decoder 21 is a signal converter configured to convert the received millimeter-wave signals into the original signal-to-be-transmitted, and includes, for example, a square-law (squaring) detector circuit. Specifically, the signal decoder 21 is configured to square, by the multiplier 212, millimeter-wave signals (ASK modulation waves) from the buffer 211, to thereby convert the millimeter-wave signals into signals-to-be-transmitted, and to output the signals-to-be-transmitted via the buffer 213. The connector apparatus 50 is interposed between the waveguide cable 30 and the receiver 20.

The waveguide cable 30 has a waveguide structure configured to confine millimeter waves in the waveguide and to transmit the millimeter waves at the same time, and is capable of transmitting millimeter-waveband electromagnetic waves efficiently. If the waveguide cable 30 is made of a dielectric waveguide, for example, preferably, the dielectric waveguide 30 includes a dielectric material having a relative permittability of a predetermined range and a dielectric tangent of a predetermined range.

Here, with regard to the "predetermined range", it is only necessary that a relative permittability or a dielectric tangent of a dielectric material has a range, with which desirable effects may be attained, and it is only necessary that the range is determined as long as desirable effects are attained. It should be noted that the property of the dielectric waveguide is determined based on not only a dielectric material itself but also the length of a transmission path and the frequency (wavelength) of millimeter waves. In this way, a relative permittability or a dielectric tangent of a dielectric material is not necessarily determined specifically, but, for example, may be determined as follows.

In order to transmit millimeter-wave signals in the dielectric waveguide at higher speed, desirably, a relative permittability of a dielectric material is about 2 to 10 (desirably, 3 to 6), and its dielectric tangent is about 0.00001 to 0.01 (desirably, 0.00001 to 0.001). Examples of dielectric materials satisfying such conditions include, for example, dielectric materials made of acrylic resin, urethane resin, epoxy resin, silicone, polyimide, and cyanoacrylate resin.

<Connector Apparatus According to the Embodiment>

In the below-described example, the embodiment is applicable to the connector apparatus 40 interposed between the sender 10 and the waveguide cable 30. It should be noted that the embodiment is applicable not only to the connector apparatus 40 interposed between the sender 10 and the waveguide cable 30, but also to the connector apparatus 50 interposed between the waveguide cable 30 and the receiver 20, in a similar manner to the connector apparatus 40.

In general, a connector apparatus includes a so-called male/female pair, i.e., a pair of a first connector unit (one of male/female) and a second connector unit (the other of male/female). A connector apparatus, which includes this pair, is a connector apparatus according to a third mode. It should be noted that a connector apparatus according to the embodiment is not limited to the connector apparatus according to the third mode. For example, a connector apparatus according to the embodiment may be one including only one connector unit, and this connector apparatus is a connector apparatus according to a first mode or a second mode.

Here, as a connector apparatus according to the embodiment of the present disclosure, a connector apparatus according to the third mode including a pair of the first connector unit and the second connector unit will be described for illustrative purposes.

FIG. 2A is a partial-cross-sectional plan view showing the connector apparatus (i.e., connector apparatus according to third mode) according to the embodiment of the present disclosure before coupling, and FIG. 2B is a partial-cross-sectional plan view showing the connector apparatus coupled.

The connector apparatus 40 according to the embodiment includes a pair of the first connector unit 41 on the circuit board 60 and the second connector unit 42 on the waveguide cable 30. Here, the circuit board 60 is a plate-like dielectric board, and is made of a printed board, which fixes electronic components, forms wiring, and establishes an electronic circuit.

In the first connector unit 41, the two feeder wires 61A, 61B made of linear conductor foils are formed on the circuit board 60 in parallel. The feeder wires 61A, 61B made of linear conductor foils transmit (transfer) electromagnetic waves based on millimeter-waveband signals output from the semiconductor chip 62 on which the signal generator 11 and the like of the sender 10 are integrated.

The hollow waveguide 70 made of metal such as copper or aluminum is provided on the ends of the feeder wires 61A, 61B in the transmit-destination direction. The hollow waveguide 70 is provided on the circuit board 60, and is electromagnetically-coupled with the feeder wires 61A, 61B. How the hollow waveguide 70 is electromagnetically-coupled with the feeder wires 61A, 61B will be described later in detail. The spacer 71 is provided on the hollow waveguide 70 on the opposite side of the feeder wires 61A, 61B. The spacer 71 is interposed between the hollow waveguide 70 and the end of the waveguide cable 30 when the first connector unit 41 is connected to the second connector unit 42, and is configured to match impedance.

The cylindrical first coupler 72 is mounted on the circuit board 60, and surrounds the feeder wires 61A, 61B, the hollow waveguide 70, and the spacer 71. The first coupler 72 is made of plastic or the like, and includes the stopper 73 and the elastically-deformable protrusion 74 formed on its inner wall.

Meanwhile, the second connector unit 42 includes the second coupler 75 mounted on the end of the waveguide cable 30. As shown in FIG. 2B, when the second coupler 75 is pushed in the first coupler 72 of the first connector unit 41 until its opening end comes into contact with the stopper 73, the second coupler 75 is fixed to the first coupler 72 owing to reaction force of elastic deformation of the protrusion 74.

In other words, the first connector unit 41 and the second connector unit 42 are detachably coupled owing to cooperation between the first coupler 72 and the second coupler 75. Note that the above-mentioned coupling structure of the first coupler 72 and the second coupler 75 is merely an example, the coupling structure is not limited to this, and the coupling structure may be any structure (mechanism) as long as the first connector unit 41 and the second connector unit 42 are detachably coupled.

As shown in FIG. 2B, when the first connector unit 41 is connected to the second connector unit 42, the hollow waveguide 70 is interposed between the feeder wires 61A, 61B of the circuit board 60 and the end of the waveguide cable 30. Further, in this example, the spacer 71 configured to match impedance is interposed between the hollow waveguide 70 and the end of the waveguide cable 30. It should be noted that the connector apparatus 40 according to the embodiment does not necessarily include the spacer 71.

As described above, the first connector unit 41 and the second connector unit 42 of the connector apparatus 40 according to the embodiment are structured detachably. With this structure, it is possible to connect the waveguide cable 30 to the circuit board 60 as needed, or to disconnect the waveguide cable 30 therefrom. Further, the hollow waveguide 70 made of metal such as copper or aluminum is interposed between the coupled portions. Therefore it is possible to easily manufacture the portions-to-be-coupled of the connector apparatus 40 by using dies or metal plates or by cutting.

Note that, according to the above-mentioned example of the embodiment, the technique of the present disclosure, in which the hollow waveguide 70 is interposed and the first connector unit 41 and the second connector unit 42 are detachably connected, is applicable to the first connector unit 41. Alternatively, the technique is applicable to the second connector unit 42 similarly. Specifically, the hollow waveguide 70 may be provided at the end of the waveguide cable 30 while the hollow waveguide 70 is electromagnetically-coupled to the waveguide cable 30, and the first connector unit 41 and the second connector unit 42 may be detachably connected via the hollow waveguide 70. In this case, the spacer 71 configured to match impedance may be interposed between the hollow waveguide 70 and the ends of the feeder wires 61A, 61B.

Hereinafter, specific examples of the connector apparatus 40 of the embodiment will be described.

EXAMPLE 1

FIG. 3 is a perspective view schematically showing a connector apparatus according to Example 1. Further, FIG. 4A is a plan view of FIG. 3, FIG. 4B is a side view of FIG. 3, and FIG. 4C is a cross-sectional view showing a hollow waveguide and a spacer. Here, FIG. 3 show each of both the connector apparatus 40 interposed between the sender 10 and the waveguide cable 30 and the connector apparatus 50 interposed between the receiver 20 and the waveguide cable 30 of FIG. 1B.

In Example 1, a dielectric waveguide, the dielectric constant of the dielectric being for example 2.1, is used as the waveguide cable 30. For example, the size of the dielectric waveguide is about 3 [mm] in height and about 1.5 [mm] in width. Further, a hollow ridge waveguide made of metal such as copper or aluminum is used as the spacer 71. For example, the size of the hollow ridge waveguide (ridge 71) is about 3.6 [mm] in height and about 1.5 [mm] in width. Further, for example, the size of each ridge portion 71A of the hollow ridge waveguide (ridge 71) is about 1 [mm] in height and about 0.2 [mm] in width.

Further, for example, the size of the hollow waveguide 70 is about 4.3 [mm] in height, about 1.5 [mm] in width, and about 1.4 [mm] in length. Further, the length of the waveguide cable 30 and the length of the hollow ridge waveguide (ridge 71) are determined such that the distance between the end surface of the hollow waveguide 70 at the sender 10 side and the end surface of the hollow waveguide 70 at the receiver 20 side is for example about 10 [mm].

FIG. 5A shows a structural example of the ends of the feeder wires 61A, 61B on the circuit board 60. The left diagram of FIG. 5A shows the structure of the A surface (front surface) of the circuit board 60, and the right diagram of FIG. 5A shows the structure of the B surface (back surface) of the circuit board 60. Here, as the circuit board 60, for example, a double-sided board whose thickness is 0.2 [mm] and specific inductive capacity is 4.3 is used.

The interval between the two feeder wires 61A, 61B and the wire widths of the feeder wires 61A, 61B are determined based on the characteristic impedance of the waveguide cable 30. The opening pattern 43 is formed at the ends of the feeder wires 61A, 61B, the opening pattern 43 gradually expanding from the ends of the feeder wires 61A, 61B to the edge of the circuit board 60, for example, the opening pattern 43 being a tapered opening. Note that, here, the opening pattern 43 has a tapered shape. Alternatively, for example, the opening pattern 43 may gradually expand stepwise toward the edge of the circuit board 60.

Here, the length L of the opening pattern 43 from the ends of the feeder wires 61A, 61B to the opening end, i.e., the length L of the tapered portion, is determined based on the wavelength λ of radio waves. Here, the wavelength λ of radio waves is not the wavelength of radio waves in a free space (in air), but the wavelength of radio waves in the circuit board 60. Because the specific inductive capacity of the circuit board 60 is higher than the specific inductive capacity of a free space, the wavelength λ of radio waves in the circuit board 60 is smaller than the wavelength of radio waves in a free space. In this way, the length L of the tapered portion is determined based on the wavelength λ of radio waves in the circuit board 60. Here, for example, the length L of the tapered portion is set to about 1.4 [mm].

The conductive pattern 44 is formed on the back surface (B surface) of the circuit board 60, where the opening pattern 43 is formed on the front surface (A surface). Further, the opening pattern 43 is electrically connected to the conductive pattern 44 through the via holes 45.

As described above, in the feeder wires 61A, 61B including the opening pattern 43 at the ends, the feeder wires 61A, 61B transmit electromagnetic waves (electromagnetic field distribution), the opening pattern 43 makes the electromagnetic waves wider in the board plane (in horizontal plane) of the circuit board 60, and the electromagnetic waves are emitted into the hollow waveguide 70. Accordingly, signals are transmitted between the ends of the feeder wires 61A, 61B, i.e., the opening pattern 43, and the hollow waveguide 70 through electromagnetic induction (electromagnetically-coupling). In this case, electromagnetically-coupling between the feeder wires 61A, 61B and the hollow waveguide 70 is horizontal-electric-field coupling.

Here, in order to transmit signals between the opening pattern 43 and the hollow waveguide 70 favorably, the width W1 of the opening end of the opening pattern 43 and the opening width W2 are determined based on the size of the hollow waveguide 70. In the horizontal-electric-field coupling of the feeder wires 61A, 61B and the hollow waveguide 70, the two longer surfaces of the hollow waveguide 70 are intersect with the electric field. Therefore, for example, the width W1 of the opening end of the opening pattern 43 is about 1.5 [mm] and the opening width W2 is about 0.7 [mm], where the width of the hollow waveguide 70 is 1.5 [mm].

As described above, the connector apparatus of Example 1 is applied to a radio transmission system, which includes, as the waveguide cable 30, a dielectric waveguide more flexible than a hollow waveguide. It should be noted that application to a radio transmission system including a hollow waveguide as the waveguide cable 30 is not eliminated.

Further, the connector apparatus of Example 1 is structured such that a hollow ridge waveguide serving as the spacer 71 is interposed between the hollow waveguide 70 and the waveguide cable 30. With this structure, it is possible to match impedance better between the opening pattern 43 at the ends of the feeder wires 61A, 61B and the waveguide cable 30 being a dielectric waveguide than the case where only the hollow waveguide 70 is used. As a result, it is possible to improve the transmission property of signals between the feeder wires 61A, 61B and the waveguide cable 30. FIG. 5B shows transmission properties between the feeder wires 61A, 61B and the waveguide cable 30 of Example 1. In FIG. 5B, S11 shows a reflection coefficient of an S parameter, and S21 shows a permeability coefficient of the S parameter.

By the way, because a dielectric is filled in the waveguide of the waveguide cable 30 being a dielectric waveguide, the cutoff frequency is low. Meanwhile, if a hollow waveguide having the same size is used, the cutoff frequency is increased. From this viewpoint, because the cutoff frequency in the case where a hollow ridge waveguide is interposed between the hollow waveguide 70 and the waveguide cable 30 is lower than the cutoff frequency in the case where a hollow waveguide is used, if is possible to match impedance easier between the feeder wires 61A, 61B and the waveguide cable 30 than the case where only the hollow waveguide 70 is used.

EXAMPLE 2

Figure 6:
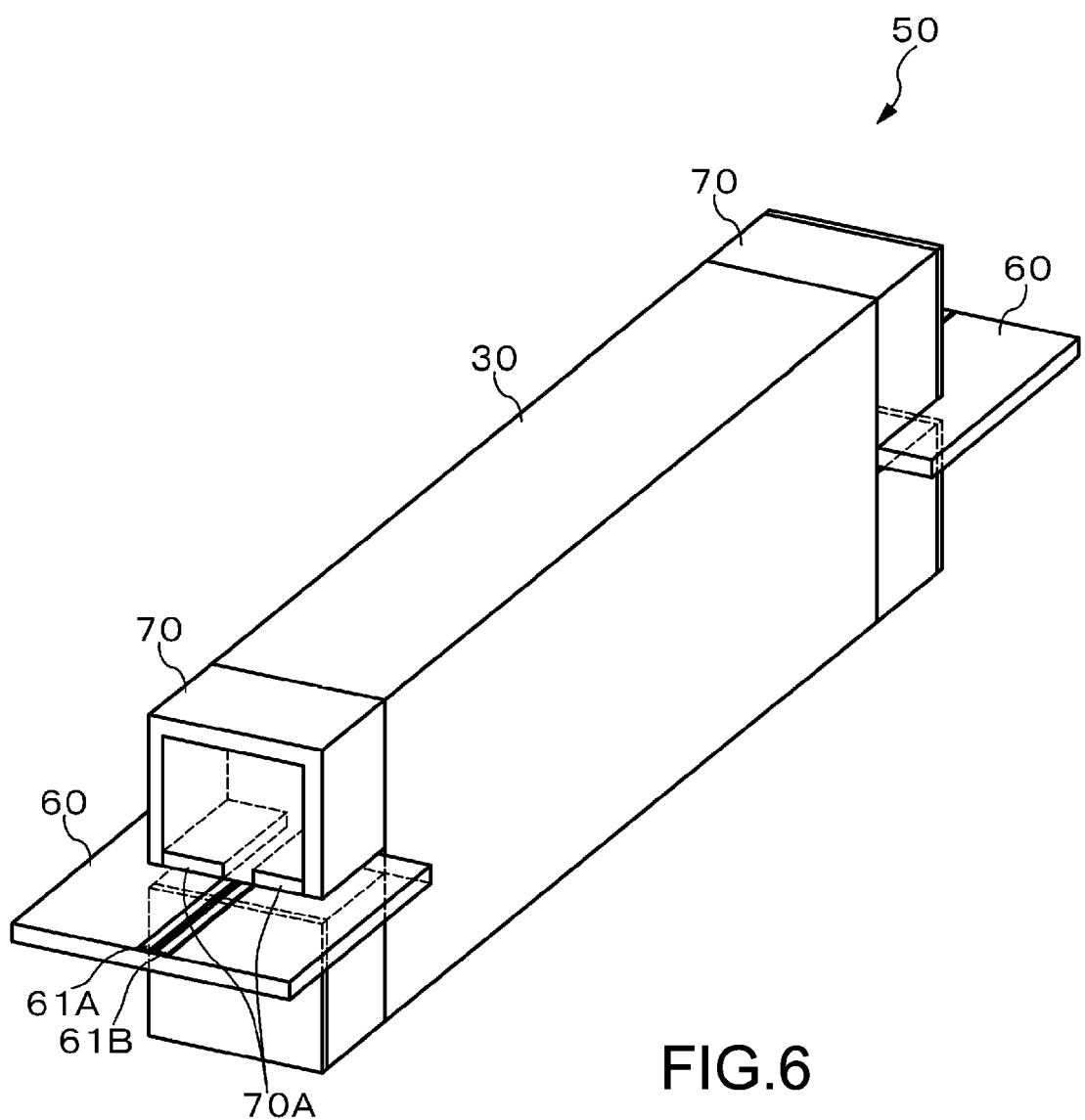
FIG. 6 is a perspective view schematically showing a connector apparatus of Example 2.

FIG. 6 is a perspective view schematically showing a connector apparatus of Example 2. Further, FIG. 7A is a plan view showing that of FIG. 6, FIG. 7B is a side view showing that of FIG. 6, and FIG. 7C is a cross-sectional view showing a hollow ridge waveguide used as a hollow waveguide.

According to the structure of Example 2, a hollow ridge waveguide is used as the hollow waveguide 70, and the spacer 71 is not provided. The structure except for that is basically similar to that of Example 1. For example, the height of a hollow ridge waveguide (the hollow waveguide 70) is about 3 [mm], and its width is about 1.5 [mm]. Further, for example, the height of the ridge portion 70A of the hollow ridge waveguide (70) is about 0.2 [mm] and its width is about 0.55 [mm].

FIG. 8A shows an example of the structure of the ends of the feeder wires 61A, 61B on the circuit board 60. The left diagram of FIG. 8A shows the structure of the A surface of the circuit board 60, and the right diagram of FIG. 8A shows the structure of the B surface of the circuit board 60. The structure of the opening pattern 43 at the ends of the feeder wires 61A, 61B is basically similar to that of Example 1. It should be noted that, in Example 2, the length L of the tapered portion of the opening pattern 43 is about 1.3 [mm].

According to the above-mentioned connector apparatus of Example 2, only a hollow ridge waveguide is interposed between the feeder wires 61A, 61B and the waveguide cable 30. So the signal transmission property of Example 2 is a little lower than that of Example 1, in which the hollow waveguide 70 and a hollow ridge waveguide (the spacer 71) are interposed. It should be noted that, although the transmission property is a little lower, the hollow waveguide 70 may be assembled easier than the case of Example 1. FIG. 8B shows signal transmission properties between feeder wires and a waveguide cable of Example 2. In FIG. 8B, S11 shows a reflection coefficient of an S parameter, and S21 shows a permeability coefficient of the S parameter.

EXAMPLE 3

Figure 9:
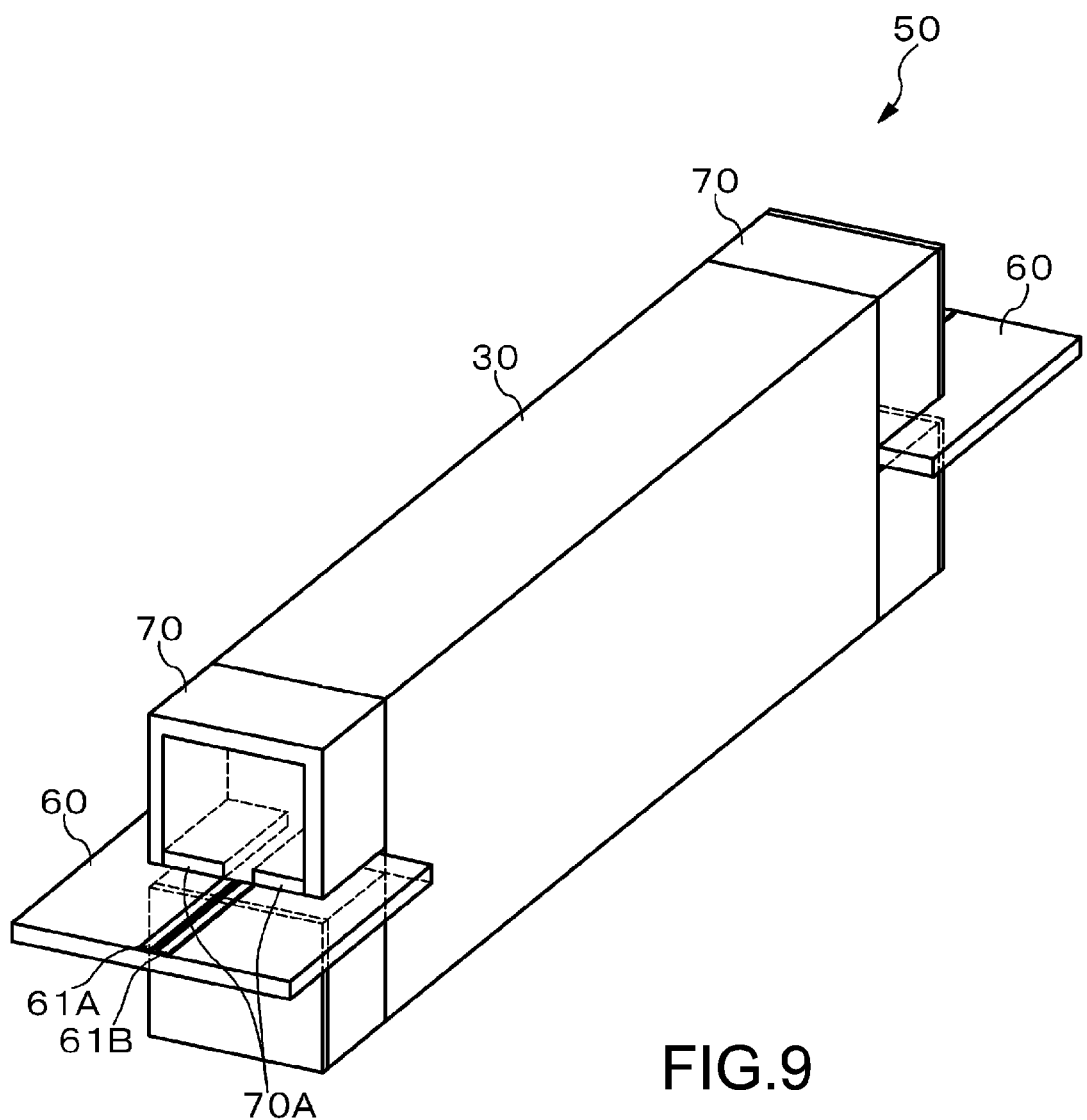
FIG. 9 is a perspective view schematically showing a connector apparatus of Example 3.

FIG. 9 is a perspective view schematically showing a connector apparatus of Example 3. Further, FIG. 10A is a plan view showing that of FIG. 9, FIG. 10B is a side view showing that of FIG. 9, and FIG. 10C is a cross-sectional view showing a hollow ridge waveguide used as a hollow waveguide, and a waveguide cable.

According to the structure of Example 3, a hollow ridge waveguide is used as the hollow waveguide 70, and the spacer 71 is not provided. In addition, a dielectric ridge waveguide is used as the waveguide cable 30. The structure except for that is basically similar to that of Example 2. For example, the dielectric constant of the dielectric serving as the waveguide cable 30 is 2.1. Further, for example, the height of a dielectric ridge waveguide (the waveguide cable 30) is about 3 [mm], and its width is about 1.5 [mm]. Further, for example, the height of the ridge portion 30A of the waveguide cable (30) is about 0.2 [mm] and its width is about 0.35 [mm].

FIG. 11A shows an example of the structure of the ends of the feeder wires 61A, 61B on the circuit board 60. The left diagram of FIG. 11A shows the structure of the A surface of the circuit board 60, and the right diagram of FIG. 8A shows the structure of the B surface of the circuit board 60. The structure of the opening pattern 43 at the ends of the feeder wires 61A, 61B is basically similar to that of Example 2.

According to the above-mentioned connector apparatus of Example 3, the functions and effects similar to those of Example 2 are obtained. In addition, because the waveguide cable 30 has the dielectric ridge waveguide structure, its signal transmission property is higher than that of a dielectric waveguide, which is advantageous. FIG. 11B shows signal transmission properties between feeder wires and a waveguide cable of Example 3. In FIG. 11B, S11 shows a reflection coefficient of an S parameter, and S21 shows a permeability coefficient of the S parameter.

MODIFIED EXAMPLE

According to any of Example 1 to Example 3, electro-magnetically-coupling between the feeder wires 61A, 61B and the hollow waveguide 70 is horizontal-electric-field coupling. The techniques of the present disclosure are applicable to not only horizontal-electric-field coupling but also vertical-electric-field coupling. With reference to FIG. 12A and FIG. 12B, as a modified example, an example of vertical-electric-field coupling will be described schematically. FIG. 12A is a perspective view schematically showing a connector apparatus of a modified example, and FIG. 12B is a front view showing that of FIG. 12A.

In vertical-electric-field coupling, the waveguide cable 30 is arranged laterally, i.e., the horizontal plane includes the long side and the vertical plane includes the short side. The waveguide cable 30 is, for example, a dielectric waveguide. For example, the size of the waveguide cable 30 is 1×2 [mm]. The specific inductive capacity of the dielectric is 4.0.

The laterally-arranged waveguide cable 30 is vertical-electric-field electromagnetically-coupled to the feeder wires 61A, 61B on the circuit board 60 via the ridge waveguide 80. As such, the electric field intersects with the two surfaces of the waveguide cable 30 each including the long side. The ridge waveguide 80 includes two members, i.e., the top member 80A and the bottom member 80B. As shown in FIG. 12B, the top member 80A is coupled with the bottom member 80B where the circuit board 60 is sandwiched therebetween. The top member 80A includes the ridge portion 81.

For example, the width between inner walls of the ridge waveguide 80 is 2 [mm], and the height between inner walls of the ridge waveguide 80 is 1 [mm]. The length of the ridge waveguide 80 is determined based on the wavelength λ of radio waves. Here, the wavelength λ of radio waves is not the wavelength of radio waves in a free space (in air), but the wavelength of radio waves in the circuit board 60. Thus, the length of the ridge waveguide 80 is determined based on the wavelength λ of radio waves in the circuit board 60, and is about λ/4, e.g., 0.75 [mm]. Frequencies are adjusted based on the length of the ridge waveguide 80.

Figure 13:
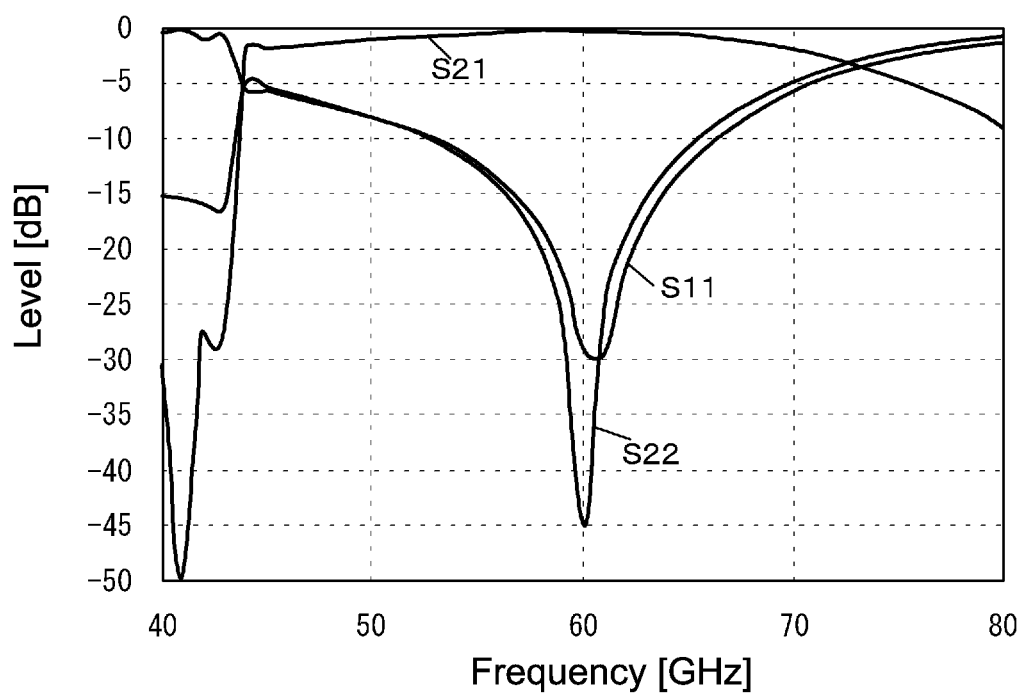
FIG. 13 shows the signal transmission property between feeder wires and a waveguide cable in the modified example.

For example, the width of the ridge portion 81 is 0.5 [mm] and its length (height) is 0.6 [mm]. The characteristic impedance is adjusted based on the length of the ridge portion 81. FIG. 13 shows the signal transmission property between feeder wires and a waveguide cable in the modified example (vertical-electric-field coupling). In FIG. 13, S11, S22 show reflection coefficients of an S parameter, and S21 shows a permeability coefficient of the S parameter.

Note that the present disclosure may employ the following structures.

[A01]<Connector Apparatus . . . First Mode>
A connector apparatus, including:
a hollow waveguide provided on a circuit board, the hollow waveguide being electromagnetically-coupled with a feeder wire formed on the circuit board, in which
the hollow waveguide is detachably coupled with an end of a waveguide cable configured to transmit a high-frequency signal.
[A02] The connector apparatus according to [A01], in which
a spacer is interposed between the hollow waveguide and the end of the waveguide cable.
[A03] The connector apparatus according to [A02], in which
the spacer is a hollow waveguide.
[A04] The connector apparatus according to [A01], in which
the hollow waveguide is a hollow ridge waveguide.
[A05] The connector apparatus according to any one of [A01] to [A045], in which
the waveguide cable is a dielectric waveguide.
[A06] The connector apparatus according to any one of [A01] to [A04], in which
the waveguide cable is a dielectric ridge waveguide.
[A07] The connector apparatus according to any one of [A01] to [A06], in which
the high-frequency signal is a millimeter-waveband signal.
[A08] The connector apparatus according to [A07], in which
the waveguide cable is configured to confine millimeter waves in the waveguide and transmit the millimeter waves.
[B01]<Connector Apparatus . . . Second Mode>
A connector apparatus, including:
a hollow waveguide provided on an end of a waveguide cable configured to transmit a high-frequency signal, the hollow waveguide being electromagnetically-coupled with the waveguide cable, in which
the hollow waveguide is detachably coupled with an end of a feeder wire formed on a circuit board.
[B02] The connector apparatus according to [B01], in which
a spacer is interposed between the hollow waveguide and the end of the waveguide cable.
[B03] The connector apparatus according to [B02], in which
the spacer is a hollow waveguide.
[B04] The connector apparatus according to [B01], in which
the hollow waveguide is a hollow ridge waveguide.
[B05] The connector apparatus according to any one of [B01] to [B045], in which
the waveguide cable is a dielectric waveguide.
[B06] The connector apparatus according to any one of [B01] to [B04], in which
the waveguide cable is a dielectric ridge waveguide.
[B07] The connector apparatus according to any one of [B01] to [B06], in which
the high-frequency signal is a millimeter-waveband signal.
[B08] The connector apparatus according to [B07], in which
the waveguide cable is configured to confine millimeter waves in the waveguide and transmit the millimeter waves.
[C01]<Connector Apparatus . . . Third Mode>
A connector apparatus, including:
a first connector unit provided on an end of a feeder wire formed on a circuit board;
a second connector unit provided on an end of a waveguide cable configured to transmit a high-frequency signal; and
a coupler including a hollow waveguide interposed between the first connector unit and the second connector unit, the coupler being configured to detachably couple the first connector unit and the second connector unit.
[C02] The connector apparatus according to [C01], in which
the hollow waveguide is provided on the circuit board, the hollow waveguide being electromagnetically-coupled with the end of the feeder wire.
[C03] The connector apparatus according to [C02], in which
a spacer is interposed between the hollow waveguide and the end of the waveguide cable.
[C04] The connector apparatus according to [C03], in which
the spacer is a hollow waveguide.
[C05] The connector apparatus according to [C01], in which
the hollow waveguide is provided on an end of a waveguide cable, the hollow waveguide being electromagnetically-coupled with the waveguide cable.
[C06] The connector apparatus according to [C05], in which
a spacer is interposed between the hollow waveguide and the end of the waveguide cable.
[C07] The connector apparatus according to [C06], in which
the spacer is a hollow waveguide.
[C08] The connector apparatus according to [C01], in which
the hollow waveguide is a hollow ridge waveguide.
[C09] The connector apparatus according to any one of [C01] to [C085], in which
the waveguide cable is a dielectric waveguide.
[C10] The connector apparatus according to any one of [C01] to [C08], in which
the waveguide cable is a dielectric ridge waveguide.
[C11] The connector apparatus according to any one of [C01] to [C10], in which
the high-frequency signal is a millimeter-waveband signal.
[C12] The connector apparatus according to [C11], in which
the waveguide cable is configured to confine millimeter waves in the waveguide and transmit the millimeter waves.

[D01]<Radio Transmission System>
A wireless transmission system, including:
a sender configured to send a high-frequency signal;
a receiver configured to receive the high-frequency signal;
a waveguide cable configured to transmit the high-frequency signal between the sender and the receiver; and
a connector apparatus configured to connect at least one of the sender and the receiver, and the waveguide cable, in which
the connector apparatus includes
a first connector unit provided on an end of a feeder wire formed on a circuit board,
a second connector unit provided on an end of a waveguide cable configured to transmit a high-frequency signal, and
a coupler including a hollow waveguide interposed between the first connector unit and the second connector unit, the coupler being configured to detachably couple the first connector unit and the second connector unit.
[D02] The connector apparatus according to [D01], in which
the hollow waveguide is provided on the circuit board, the hollow waveguide being electromagnetically-coupled with the end of the feeder wire.
[D03] The connector apparatus according to [D02], in which
a spacer is interposed between the hollow waveguide and the end of the waveguide cable.
[D04] The connector apparatus according to [D03], in which
the spacer is a hollow waveguide.
[D05] The connector apparatus according to [D01], in which
the hollow waveguide is provided on an end of a waveguide cable, the hollow waveguide being electromagnetically-coupled with the waveguide cable.
[D06] The connector apparatus according to [D05], in which
a spacer is interposed between the hollow waveguide and the end of the waveguide cable.
[D07] The connector apparatus according to [D06], in which
the spacer is a hollow waveguide.
[D08] The connector apparatus according to [D01], in which
the hollow waveguide is a hollow ridge waveguide.
[D09] The connector apparatus according to any one of [D01] to [D085], in which
the waveguide cable is a dielectric waveguide.
[D10] The connector apparatus according to any one of [D01] to [D08], in which
the waveguide cable is a dielectric ridge waveguide.
[D11] The connector apparatus according to any one of [D01] to [D10], in which
the high-frequency signal is a millimeter-waveband signal.
[D12] The connector apparatus according to [D11], in which
the waveguide cable is configured to confine millimeter waves in the waveguide and transmit the millimeter waves.

DESCRIPTION OF REFERENCE NUMERALS 1 wireless transmission system
10 sender
11 signal generator
20 receiver
21 signal decoder
30 waveguide cable
40, 50 connector apparatus
41 first connector unit
42 second connector unit
43 opening pattern
44 conductive pattern
45 via hole
60 circuit board
61A, 61B feeder wire
70 hollow waveguide
71 spacer
72 first coupler
73 stopper
74 protrusion
75 second coupler
80 ridge waveguide
81 ridge portion
100 first communication apparatus
111 oscillator
112, 212 multiplier
113, 211, 213 buffer
200 second communication apparatus

What is claimed is:
1. A connector apparatus, comprising:
a hollow waveguide provided on a circuit board, the hollow waveguide being electromagnetically-coupled with a feeder wire formed on the circuit board, wherein the hollow waveguide is detachably coupled with an end of a waveguide cable configured to transmit a high-frequency signal, wherein the hollow waveguide has a height and a width, wherein the waveguide cable has a height and a width, wherein at least the height of the hollow waveguide is greater than the height of the waveguide cable, wherein
a spacer is interposed between the hollow waveguide and the end of the waveguide cable, wherein the spacer has a height and a width, wherein a least the height of the hollow waveguide is greater than the height of the spacer, and wherein the height of the spacer is greater than the height of the waveguide cable.
2. The connector apparatus according to claim 1, wherein the spacer is a hollow waveguide.
3. The connector apparatus according to claim 1, wherein the hollow waveguide is a hollow ridge waveguide.
4. The connector apparatus according to claim 1, wherein the waveguide cable is a dielectric waveguide.
5. The connector apparatus according to claim 1, wherein the waveguide cable is a dielectric ridge waveguide.
6. The connector apparatus according to claim 1, wherein the high-frequency signal is a millimeter-waveband signal.
7. A connector apparatus, comprising:
a hollow waveguide provided on an end of a waveguide cable configured to transmit a high-frequency signal, the hollow waveguide being electromagnetically-coupled with the waveguide cable, wherein the hollow waveguide is detachably coupled with an end of a feeder wire formed on a circuit board, wherein the hollow waveguide has a height and a width, wherein the waveguide cable has a height and a width, wherein at least the height of the hollow waveguide is greater than the height of the waveguide cable, wherein a spacer is interposed between the hollow waveguide and the end of the waveguide cable, wherein the spacer has a height and a width, wherein a least the height of the hollow waveguide is greater than the height of the spacer, and wherein the height of the spacer is greater than the height of the waveguide cable.
8. The connector apparatus according to claim 7, wherein the spacer is a hollow waveguide.
9. The connector apparatus according to claim 7, wherein the hollow waveguide is a hollow ridge waveguide.
10. The connector apparatus according to claim 7, wherein the waveguide cable is a dielectric waveguide.

11. The connector apparatus according to claim 7, wherein the waveguide cable is a dielectric ridge waveguide.

12. The connector apparatus according to claim 7, wherein the high-frequency signal is a millimeter-waveband signal.

13. A connector apparatus, comprising:
- a first connector unit provided on an end of a feeder wire formed on a circuit board;
- a second connector unit provided on an end of a waveguide cable configured to transmit a high-frequency signal; and
- a coupler including a hollow waveguide interposed between the first connector unit and the second connector unit, the coupler being configured to detachably couple the first connector unit and the second connector unit, wherein the hollow waveguide has a height and a width, wherein the waveguide cable has a height and a width, wherein at least the height of the hollow waveguide is greater than the height of the waveguide cable, wherein a spacer is interposed between the hollow waveguide and the end of the waveguide cable, wherein the spacer has a height and a width, wherein a least the height of the hollow waveguide is greater than the height of the spacer, and wherein the height of the spacer is greater than the height of the waveguide cable.

14. The connector apparatus according to claim 13, wherein the hollow waveguide is provided on the circuit board, the hollow waveguide being electromagnetically-coupled with the end of the feeder wire.

15. The connector apparatus according to claim 13, wherein the hollow waveguide is electromagnetically-coupled with the end of the waveguide cable.

16. The connector apparatus according to claim 13, wherein the high-frequency signal is a millimeter-waveband signal.

17. A wireless transmission system, comprising:
- a sender configured to send a high-frequency signal;
- a receiver configured to receive the high-frequency signal;
- a waveguide cable configured to transmit the high-frequency signal between the sender and the receiver; and
- a connector apparatus configured to connect at least one of the sender and the receiver, and the waveguide cable, wherein
  the connector apparatus includes
  a first connector unit provided on an end of a feeder wire formed on a circuit board,
  a second connector unit provided on an end of a waveguide cable configured to transmit a high-frequency signal, and
  a coupler including a hollow waveguide interposed between the first connector unit and the second connector unit, the coupler being configured to detachably couple the first connector unit and the second connector unit, wherein the hollow waveguide has a height and a width, wherein the waveguide cable has a height and a width, wherein at least the height of the hollow waveguide is greater than the height of the waveguide cable, wherein a spacer is interposed between the hollow waveguide and the end of the waveguide cable, wherein the spacer has a height and a width, wherein a least the height of the hollow waveguide is greater than the height of the spacer, and wherein the height of the spacer is greater than the height of the waveguide cable.

18. The wireless transmission system according to claim 17, wherein the high-frequency signal is a millimeter-waveband signal.

\* \* \* \* \*